United States Patent
Huang et al.

[11] Patent Number: 5,972,299
[45] Date of Patent: Oct. 26, 1999

[54] CATALYTIC CONVERTER WITH HEATING FOR MOTORCYCLES

[75] Inventors: Huei-Huay Huang; Hong-Ping Cherg; Po-Wen Wu; Yu-Yin Peng, all of Hsinchu, Taiwan

[73] Assignee: Industrial Technology Research Institute, Hsinchu, Taiwan

[21] Appl. No.: 09/097,446

[22] Filed: Jun. 15, 1998

Related U.S. Application Data

[63] Continuation-in-part of application No. 08/720,248, Sep. 26, 1996, abandoned.
[51] Int. Cl.$^6$ ........................................................ F01N 3/10
[52] U.S. Cl. ......................... 422/173; 422/180; 422/174; 60/300; 60/303
[58] Field of Search ..................... 422/173, 177, 422/198, 180, 174, 199, 172; 60/285, 286, 299, 300, 303

[56] References Cited

U.S. PATENT DOCUMENTS

| | | | |
|---|---|---|---|
| 4,922,862 | 5/1990 | Casacci | 123/575 |
| 5,549,083 | 8/1996 | Feuling | 123/578 |
| 5,643,538 | 7/1997 | Morlec et al. | 422/173 |

Primary Examiner—Hien Tran
Attorney, Agent, or Firm—W. Wayne Liauh

[57] ABSTRACT

A catalytic converter with a heating member for use in a motorcycle. It includes (a) a catalytic member installed in an exhaust pipe of a motorcycle for converting exhaust toxic gases to nontoxic gases; (b) a liquid petroleum gas heating member including an air mixer, a liquid petroleum gas tank which is connected to the air mixer, a solenoid valve which is connected between the liquid petroleum gas tank and the air mixer for controlling a flow rate of a liquid petroleum gas into the air mixer, and a nozzle which is located at one end of the catalytic member and is connected to the air mixer; (c) a control unit connected to the solenoid valve and an ignition member located in the nozzle, for controlling the solenoid valve and for igniting a mixture of the air and the liquid petroleum gas at the nozzle to heat the catalytic member when a sensor senses an initial cold starting temperature in the catalytic member below a light-off temperature; and (d) a battery wiring to the control unit.

1 Claim, 13 Drawing Sheets

CATALYTIC CONVERTER WITH HEATING FOR MOTORCYCLES

FIELD OF THE INVENTION

This is a continuation-in-part of App. Ser. No. 08/720,248, filed Sep. 26, 1996 now abandoned.

This invention relates to an electric heating catalytic converter for motorcycle and particularly to a catalytic converter including an electric heater which can heat the catalyst quickly to the light-off temperature and thus can improve the conversion efficiency and reduce the pollution resulting from the motorcycle exhaust gas.

DESCRIPTION OF THE PRIOR ART

Figure 1:
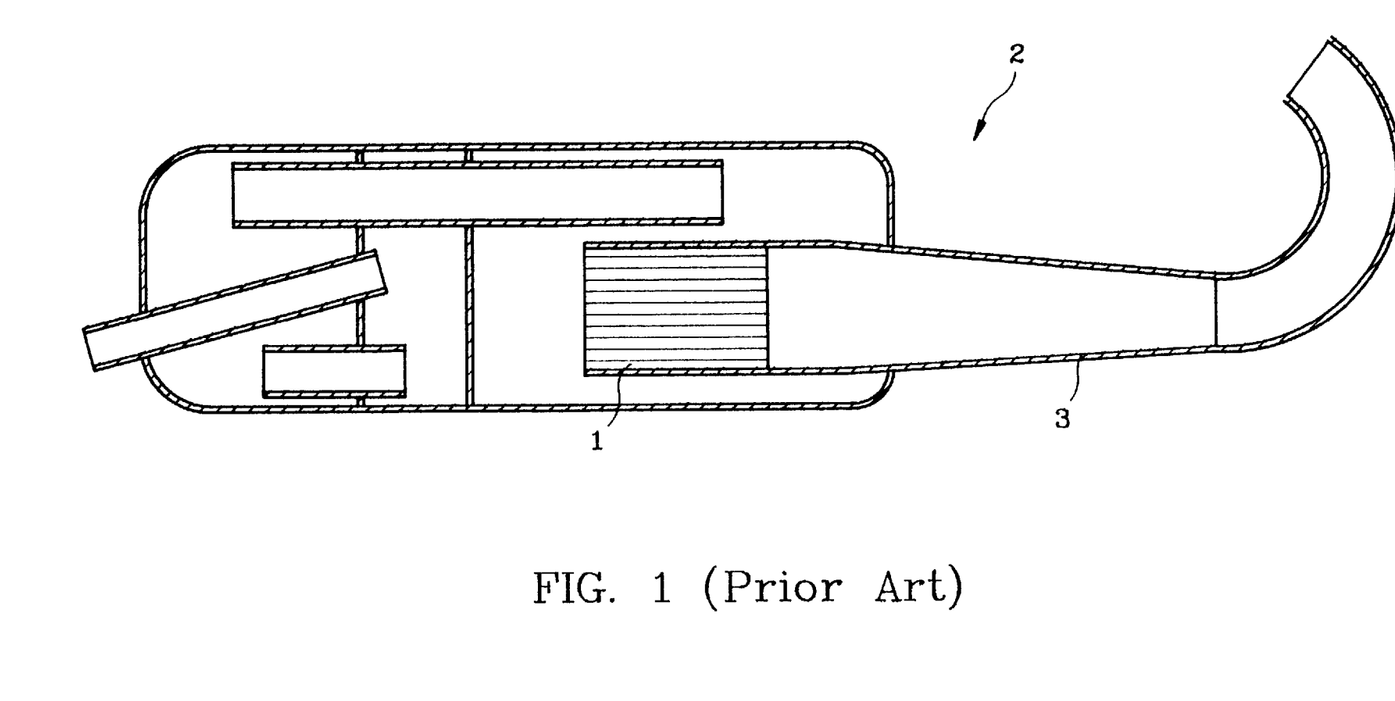
FIG. 1 is a sectional view of a conventional motorcycle catalytic converter.

Motorcycle has increasingly become a popular transportation vehicle because of its high mobility, easy of parking and relatively low cost. However motorcycle also produces a lot of air pollution. For reducing air pollution from motorcycle exhaust gas, there has been a catalytic converter being developed as shown in FIG. 1. It generally includes a catalytic converter 1 installed in the exhaust pipe 2 of a motorcycle. The catalytic converter can convert the toxic gases such as CO and HC in the exhaust gas to non-toxic elements such as $CO_2$ and $H_2O$ and thus can reduce air pollution.

The conversion efficiency of a catalytic converter is highly dependent on the exhaust gas temperature. The conversion efficiency usually drops to nearly zero when the exhaust gas temperature is lower than 200° C. When the temperature of entering gas reaches 200~300° C., or the light-off temperature as is generally called, the conversion efficiency of the catalytic converter increases rapidly. Once the catalyst is ignited, the catalytic conversion process will be self-sustained and be continuously running. During the conversion process, HC and CO in the exhaust gas will be converted to $H_2O$ and $CO_2$, and generated heat energy which also helps to sustain the catalytic conversion process. However when the engine is at the initial starting stage or at a continuously low speed condition (such as caught in the traffic jam in a city), the engine exhaust gas temperature will be relatively low. Moreover there is a heat loss at the front section 3 of the exhaust pipe 2. The gas temperature entering into the catalytic converter 1 could be lower than the light-off temperature and resulting in no-ignition of the catalyst and causes significant drop of catalytic conversion efficiency. The toxic gases such as HC and CO thus cannot be effectively oxidized and will be discharged into atmosphere. It creates a lot of air pollution problem and is very harmful to people, particularly to the motorcycle riders who get caught in a city traffic jam.

SUMMARY OF THE INVENTION

The present invention discloses a novel catalytic converter with a heating member for use in a motorcycle. In a preferred embodiment of the present invention, the catalytic converter includes (a) a catalytic member installed in an exhaust pipe of a motorcycle for converting exhaust toxic gases to nontoxic gases; (b) a liquid petroleum gas heating member including an air mixer, a liquid petroleum gas tank which is connected to the air mixer, a solenoid valve which is connected between the liquid petroleum gas tank and the air mixer for controlling a flow rate of a liquid petroleum gas into the air mixer, and a nozzle which is located at one end of the catalytic member and is connected to the air mixer; (c) a control unit connected to the solenoid valve and an ignition member located in the nozzle, for controlling the solenoid valve and for igniting a mixture of the air and the liquid petroleum gas at the nozzle to heat the catalytic member when a sensor senses an initial cold starting temperature in the catalytic member below a light-off temperature; and (d) a battery wiring to the control unit.

BRIEF DESCRIPTION OF THE DRAWINGS

FIGS. 5A to 5F are sectional views of various embodiment locations of a bar type electric heating member of the present invention.

DETAILED DESCRIPTION OF THE INVENTION

Figure 2:
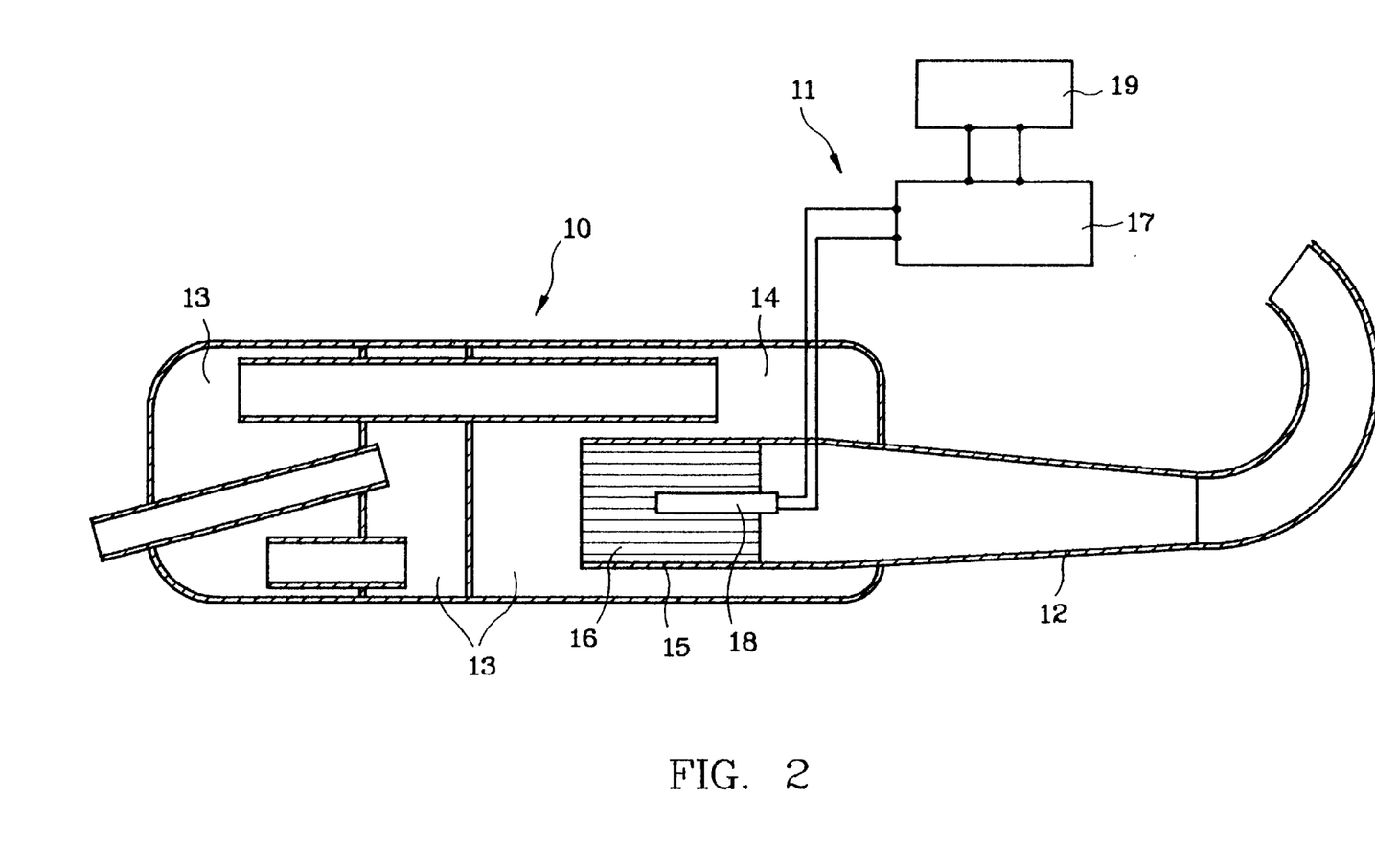
FIG. 2 is a sectional view of an electric heating catalytic converter for motorcycle of the present invention.

FIG. 2 illustrates an embodiment of the present invention. There is an electric heating catalytic converter 11 disposed in an exhaust pipe 10 of a motorcycle. The converter 11 is located at an end 15 of a front exhaust pipe 12 positioned at a front end 14 of a silencer 13. The converter 11 includes a honey comb type catalytic member 16, a control unit 17 and an electric heating member 18 located in the catalytic member 16. The control unit 17 connects with the heating member 18 and the motorcycle battery 19 which supplies electricity to the heating member 18. When the heating member 18 is energized by electricity, it can heat and consequently raises the temperature of the catalytic member 16. After heating process proceeding a predetermined time period, the electricity supply from the battery 19 will be cut off to avoid the power of the battery being drained off. Instead of using motorcycle battery for providing electricity to the heating member, a separated battery may be used for this purpose. Once the motorcycle is running, the generator (not shown in the figures) of the motorcycle will replenish electricity to the battery. The honey comb type catalytic member 16 is structured like that in the conventional catalytic converter. It is known in the art and is omitted here.

Figure 3:
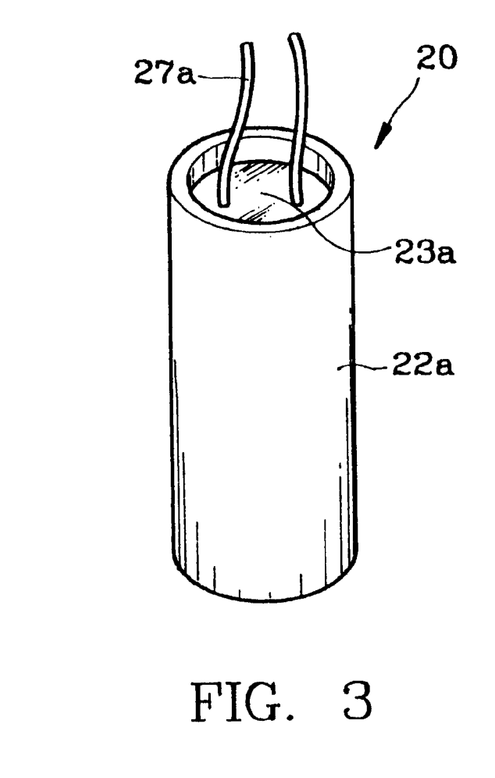
FIG. 3 is a perspective view of a bar type electric heating member of the present invention.

FIG. 3 shows an embodiment of a bar type electric heating member 20. It includes a pair of heat-resistant conducting wires 27a for linking to the control unit 17 (shown in FIG. 2). The shell 22a is made of a material which has good heat-resistant and heat-conducting property. A heating element 23a which includes a heat generating resistant material is embedded within the shell 22a.

Figure 4:
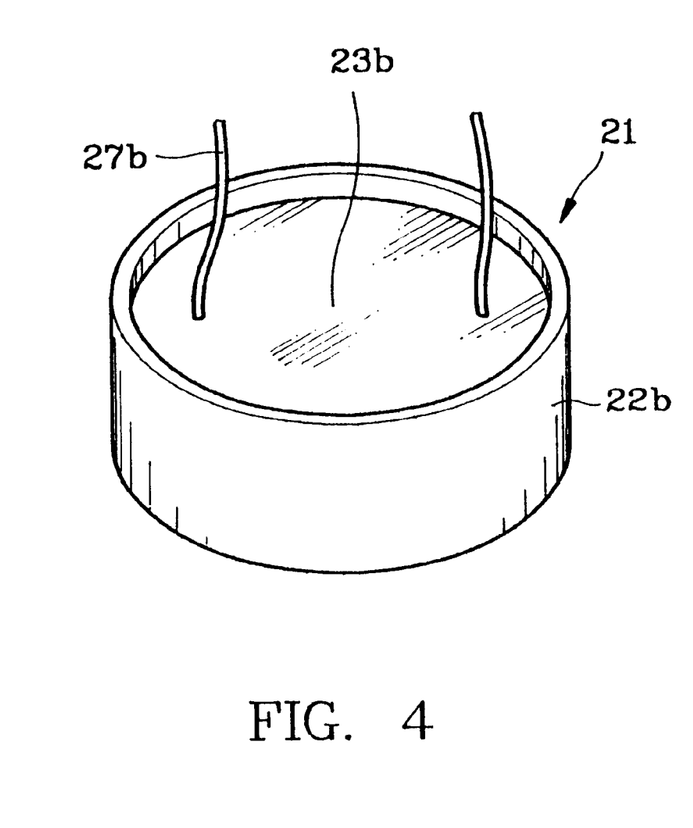
FIG. 4 is a perspective view of a block type electric heating member of the present invention.
Figure 5A:
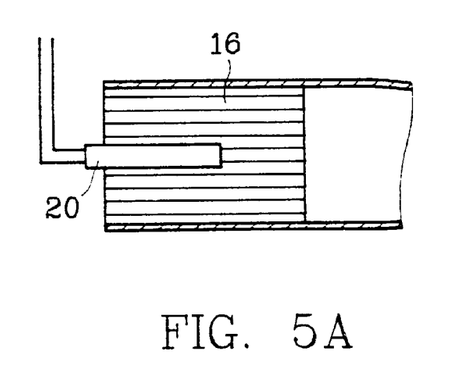
Figure 6A:
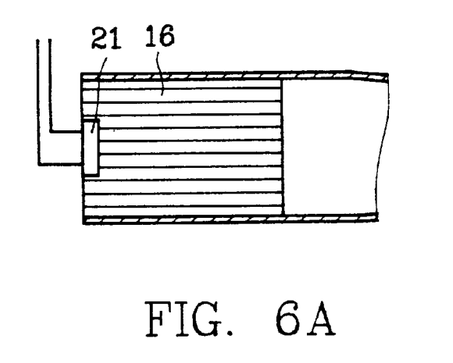
FIGS. 6A to 6F are sectional views of various embodiment locations of a block type electric heating member of the present invention.

FIG. 4 shows an embodiment of a block type electric heating member 21 which is similarly structured like that shown in FIG. 3. It includes a pair of heat-resistant conducting wire 27b, a shell 22b and a heating element 23b. The heating member 18 may be tightly fixed in the catalytic member 16 by either a mechanical coupler, welding or gluing means. The heating member (bar type 18 or 20, and block type 21) may be located at various positions in the catalytic member 16. FIG. 2 and 6F show that they are at the front end center of the catalytic member where the engine exhaust gas entering into the exhaust pipe. FIG. 5A and 6A show that they are at the rear end center of the catalytic member 16 adjacent the silencer 13.

Figure 5B:
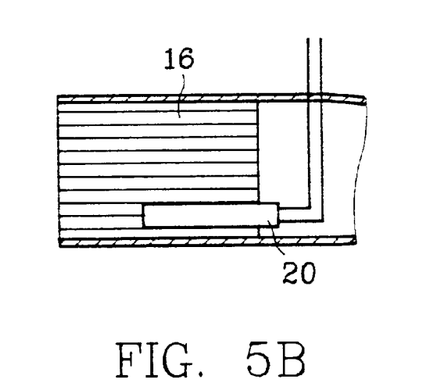
Figure 5C:
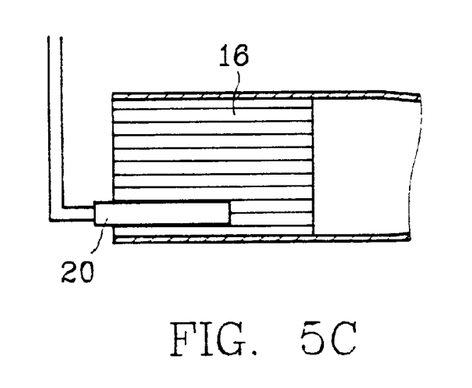
Figure 5D:
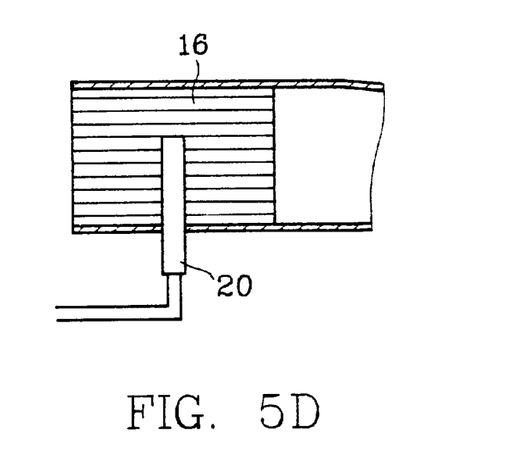
Figure 5E:
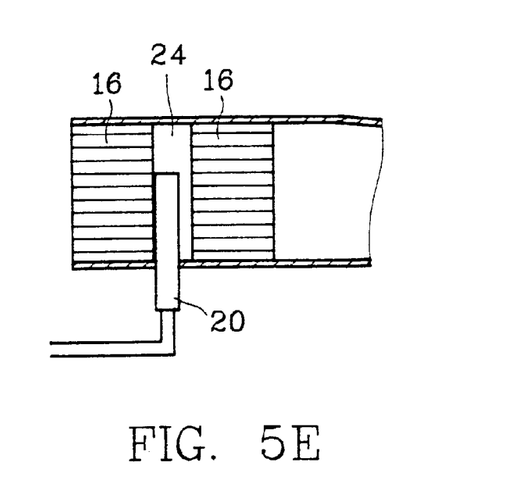
Figure 6B:
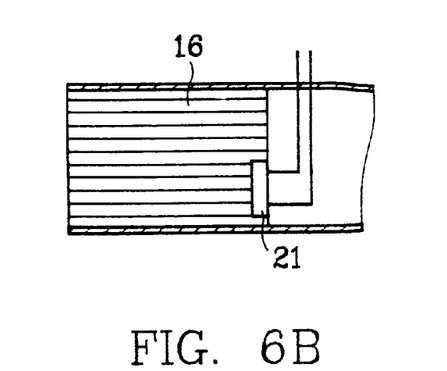
Figure 6C:
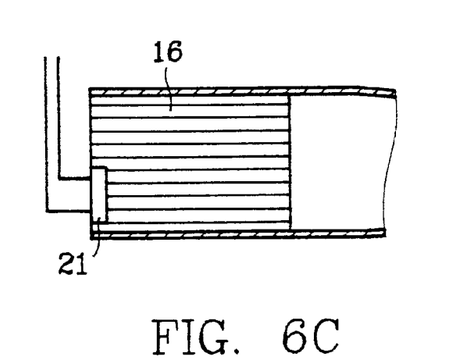
Figure 6D:
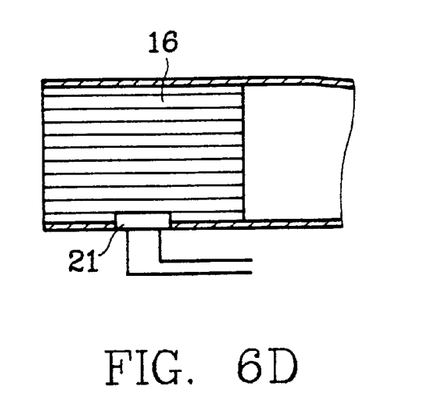
Figure 6E:
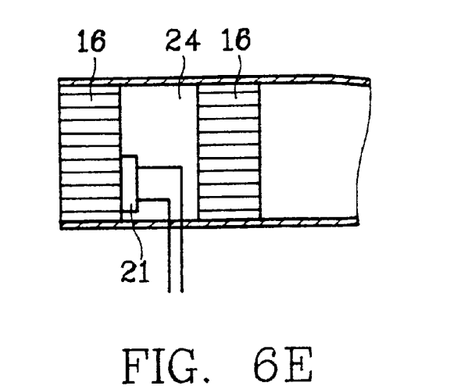
Figure 6F:
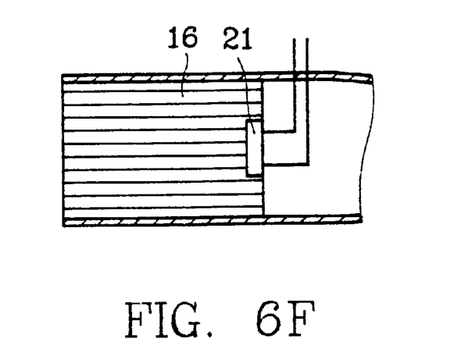

FIGS. 5B and 6B like FIGS. 2 and 6F respectively but are eccentric from the center. FIGS. 5C and 6C like FIGS. 5A and 6A respectively but are eccentric from the center. FIGS. 5D and 6D show that the heating members are located on a lateral side of the catalytic member 16. FIGS. 5E and 6E show that the catalytic member 16 is formed in two separated elements with a space portion 24 set between them. And the heating member is located in the space portion 24.

Figure 7:
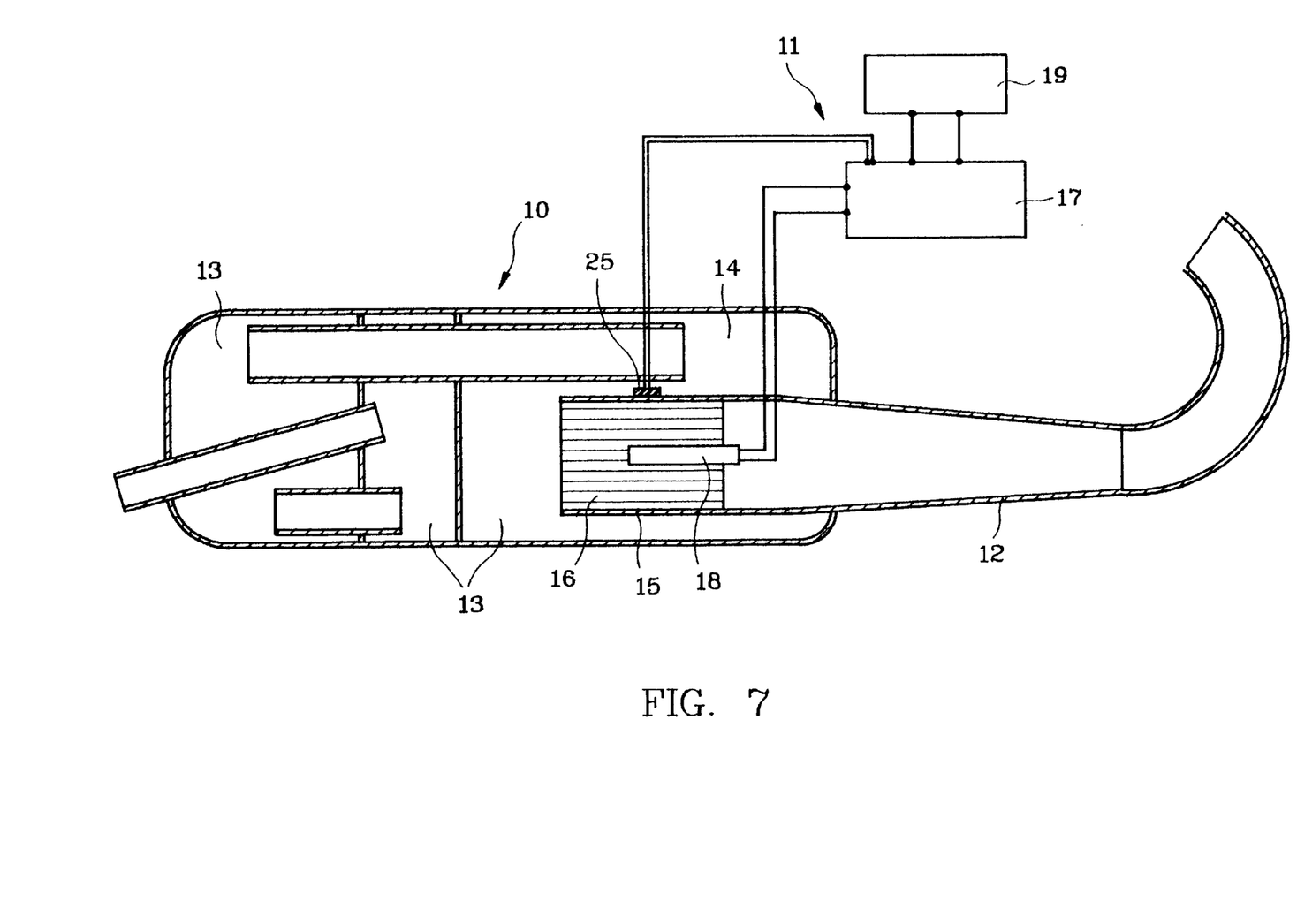
FIG. 7 is a sectional view of an embodiment of the present invention with a temperature sensor.

FIG. 7 illustrates another embodiment of the present invention. In the electric heating catalytic converter 11, the control unit 17 further connects a temperature sensor 25 which is contacted with the outside surface of the catalytic member 16. When the sensor 25 detects the temperature of the catalytic member 16 is below a predetermined temperature (i.e. when the motorcycle is at initial start stage, or the engine is under idle or low speed state for a long time, the catalytic member 16 is not well lighted off), the sensor 25 sends a signal to the control unit 17 which actuates the heating member 18 to heat. Once the catalytic member 16 is lighted off, either because of heating by the heating member 18 or the engine is running at a high speed, the control unit 17 will detect the high temperature signal sending from the sensor 25 and cut off the electricity supply to the heating member 18 to save the battery power.

Figure 8:
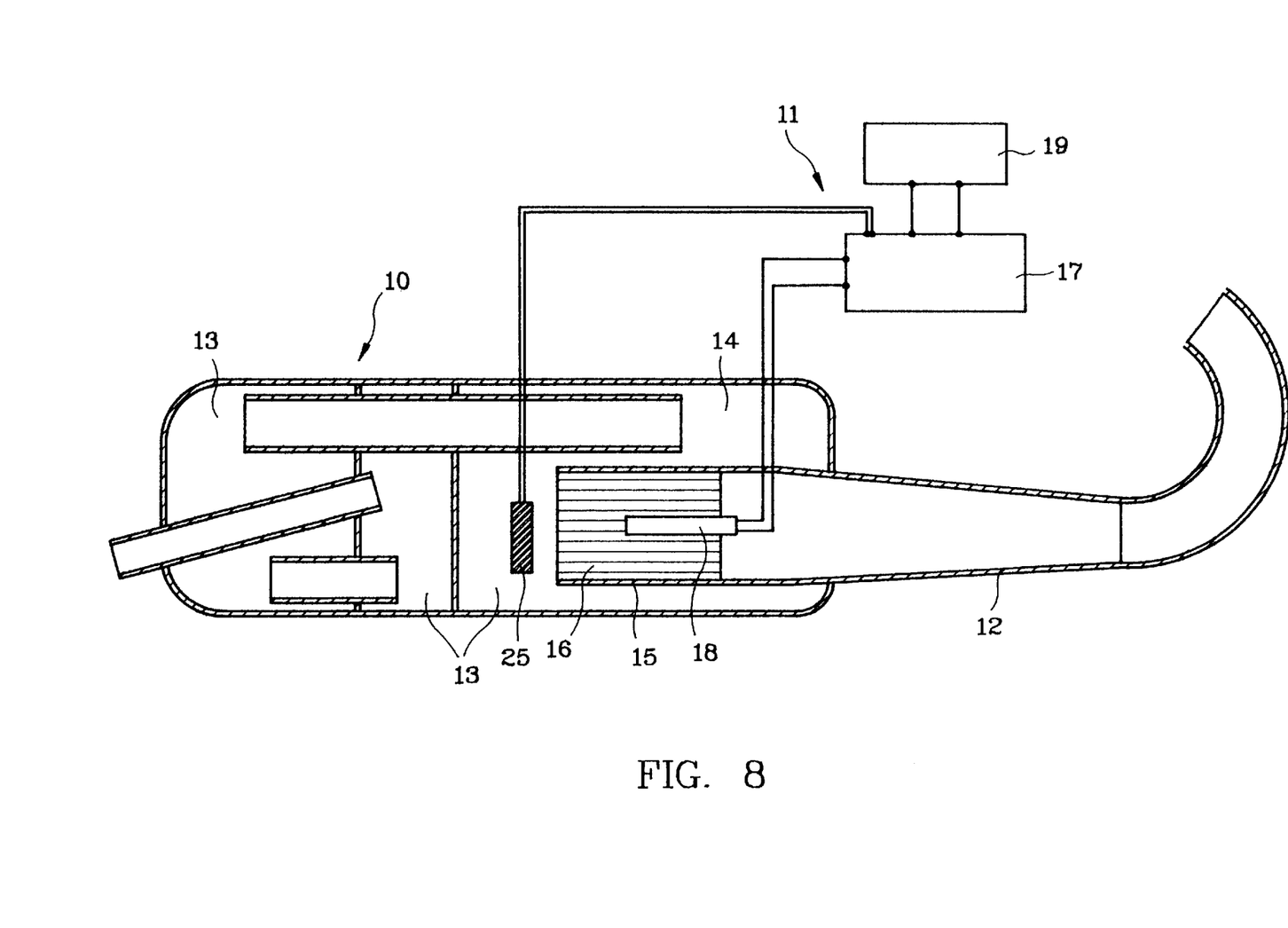
FIG. 8 is a sectional view of another embodiment of the present invention with a temperature sensor.
Figure 9:
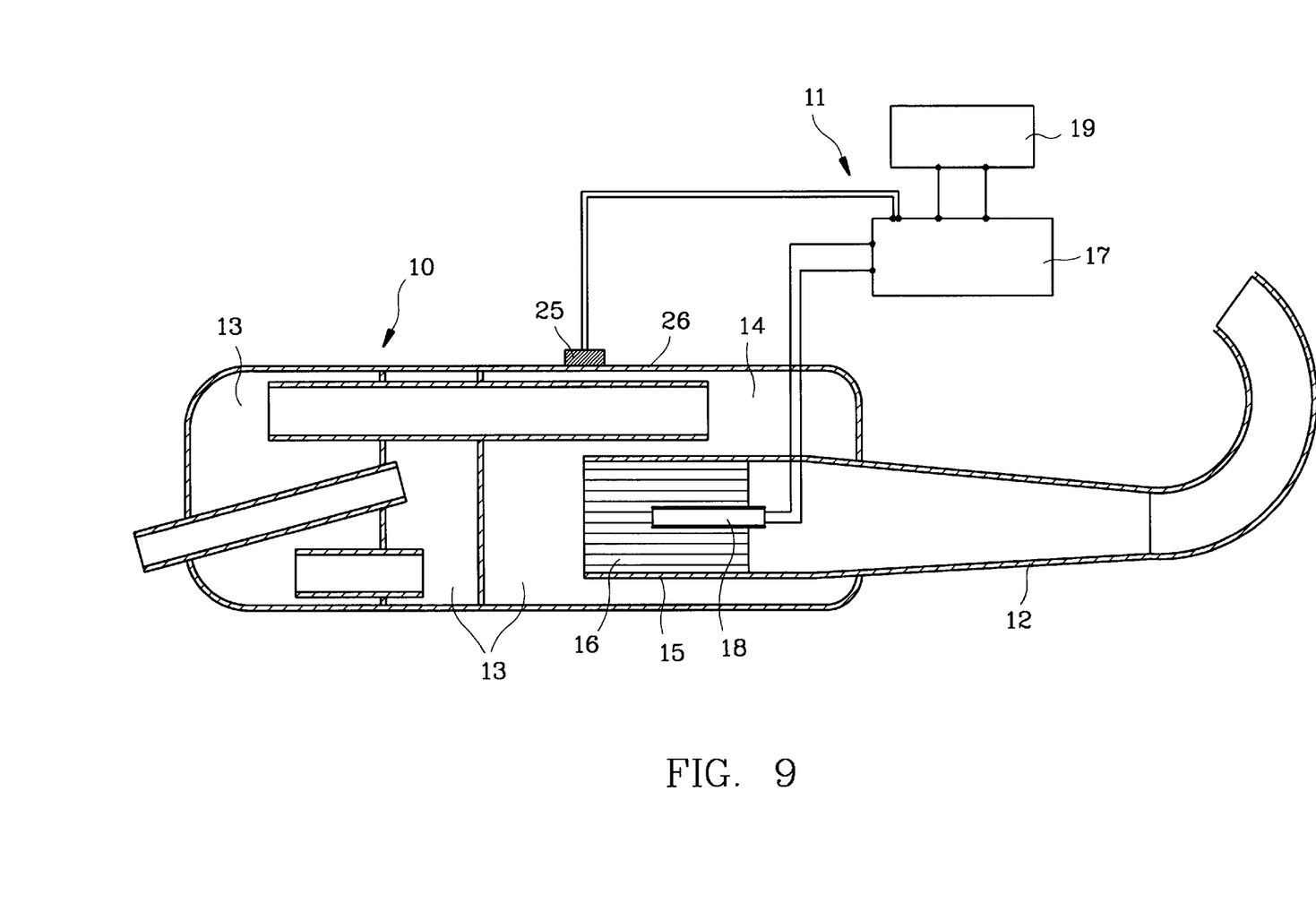
FIG. 9 is a sectional view of a further embodiment of the present invention with a temperature sensor.

The temperature sensor 25 may be located at various positions, such as in the silencer 13 (as shown in FIG. 8) or on the outside surface 26 of the silencer 13 (as shown in FIG. 9). However, the predetermined temperature value of the temperature sensor 25, which represents the light-off condition of catalytic member 16, will depend on the location of temperature sensor 25.

Figure 10:
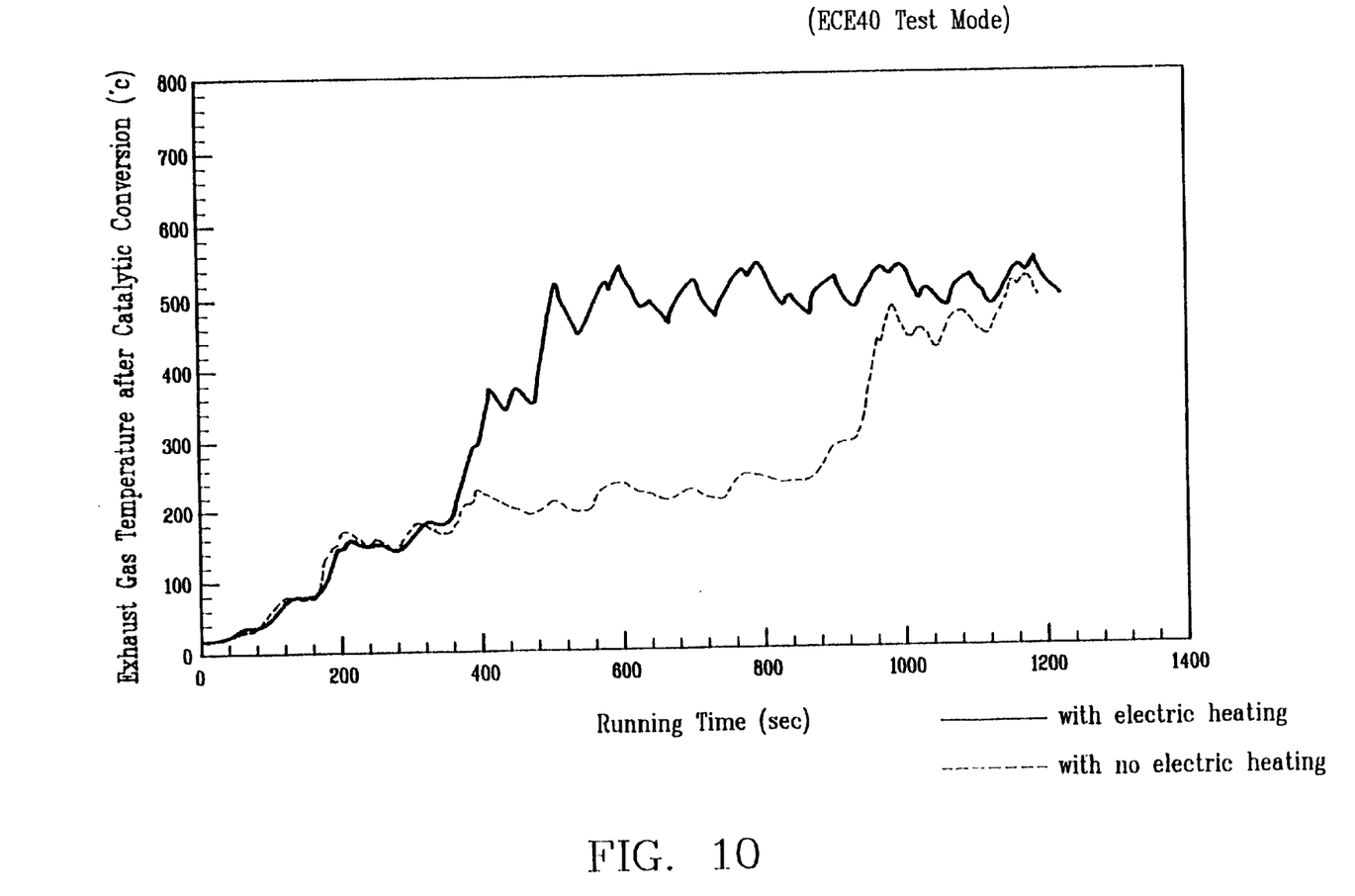
FIG. 10 is a diagram of exhaust gas temperature against time, with and without energization of the present invention, of a motorcycle running for consecutive six kilogram according to ECE-40 code.

FIG. 10 illustrates a testing result of the present invention. A motorcycle equipped with a catalytic converter is running for consecutive 6 km (running time is about 1200 seconds) under ECE-40 Test Mode condition. For a motorcycle without installing the present invention, the light-off condition of the converter is reached at about 1000 seconds after the engine was started. The exhaust gas temperature is about 500° C. when the catalytic converter is well lighted off. For a motorcycle installing the present invention and being energized (time period: 0~430 seconds), the light-off condition can be reached at about 400 seconds. It shows that the present invention can greatly improve the catalytic conversion process and effectively reduce the toxic gases, such as HC and CO, in engine exhaust gases.

Figure 11:
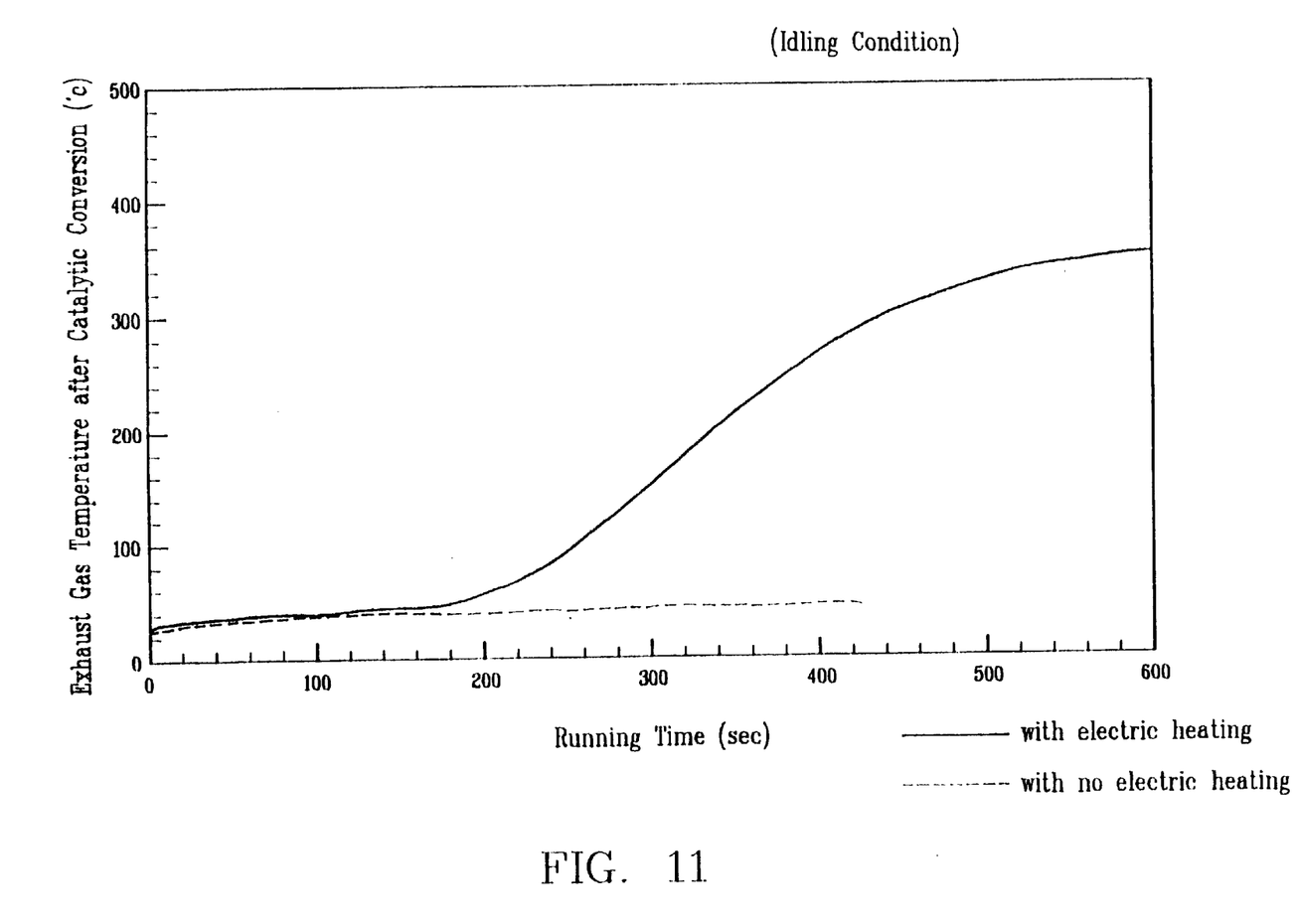
FIG. 11 is a diagram of exhaust gas temperature against time, with and without energization of the present invention, of a motorcycle running at idle condition.
Figure 12:
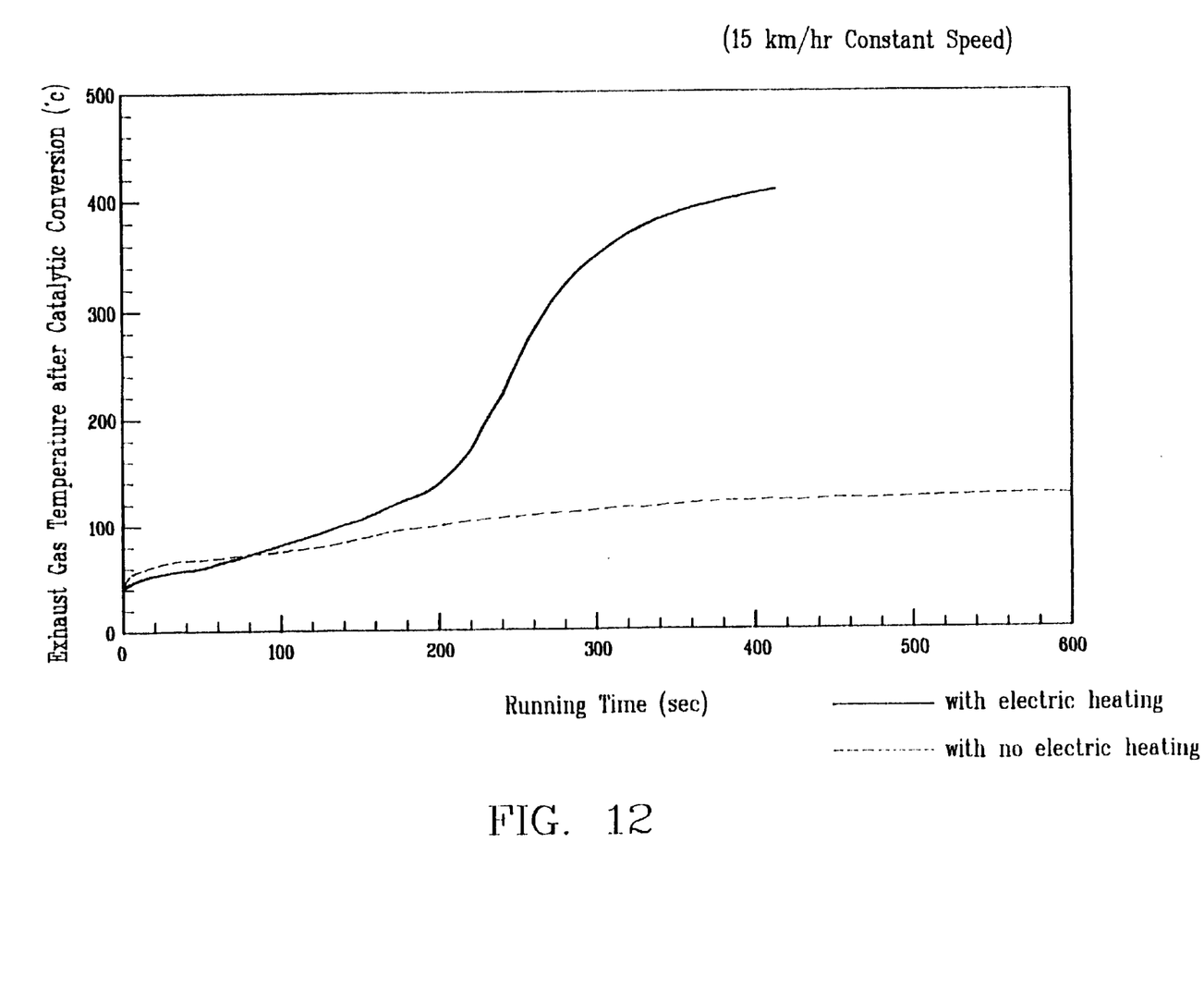
FIG. 12 is a diagram of exhaust gas temperature against time, with and without energization of the present invention, of a motorcycle running at a constant speed of 15 km/hr.

FIGS. 11 and 12 show the testing results of the present invention for a motorcycle running at idle condition or at a low speed (e.g. 15 km/hr). The present invention can make the catalytic converter reaches the light-off condition. Without the present invention, the catalytic converter cannot be fully ignited or functioned effectively.

Figure 13:
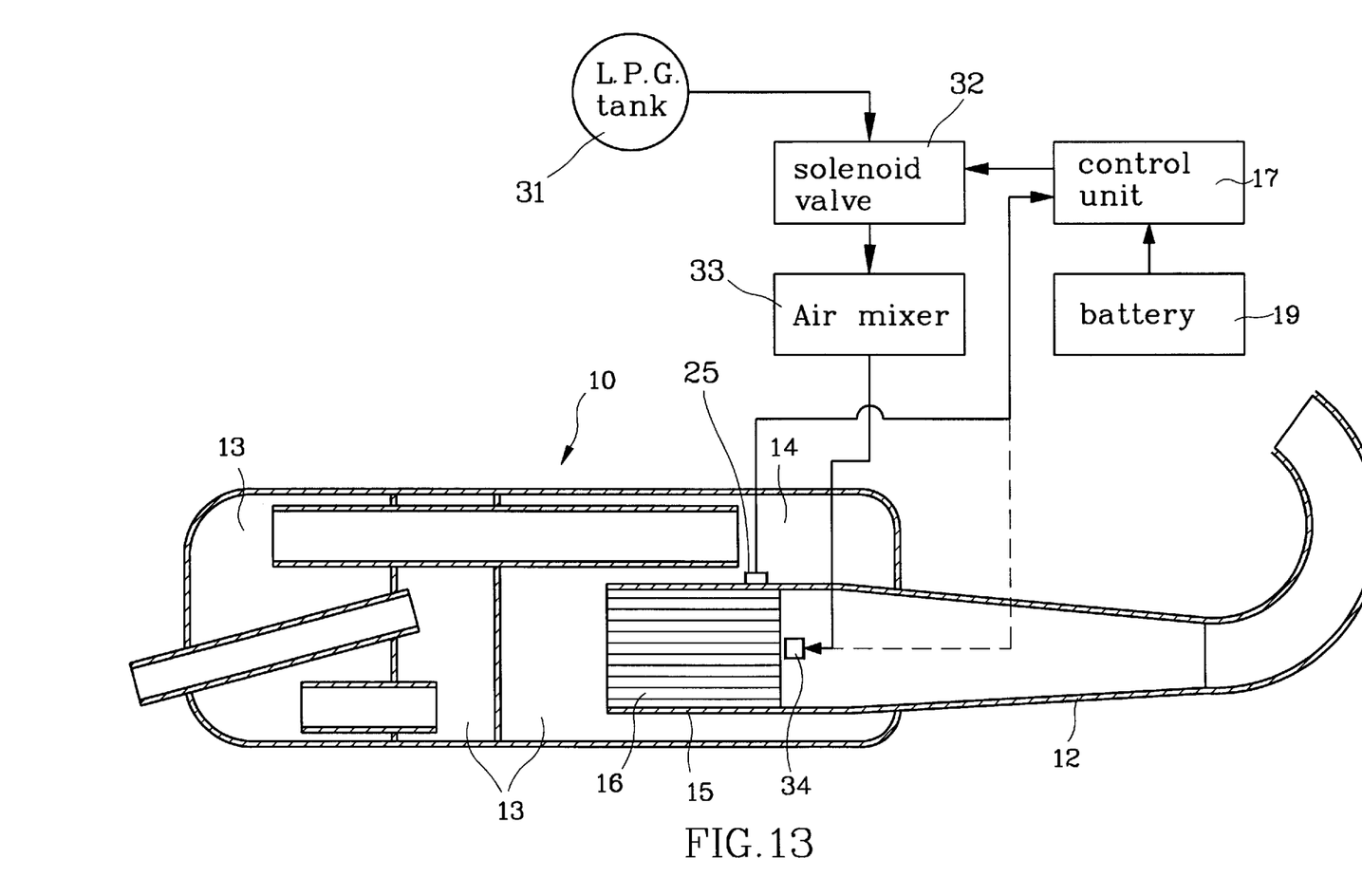
FIG. 13 is a sectional view of another embodiment of this invention.

FIG. 13 shows another embodiment of this invention. It has a catalytic member 16 located at a rear end 15 of an exhaust pipe 12 like the one shown in FIG. 9. There is a sensor 25 attached to an outside surface of the end 15 and being wired to a control unit 17 which is powered by a battery 19. Instead of heating the catalytic member 16 by an electrical heating member, this embodiment uses liquid petroleum gas as heating medium. There is provided with a liquid petroleum gas (L.P.G.) tank 31 which connects a pipe leading to an air mixer 33 which mixes liquid petroleum propane gas with air to a desired ratio. The gas and air mixture then flows to a nozzle 34 which is located in the exhaust pipe 12 and in front of the catalytic member 16. There is a solenoid valve 32 located between the L.P.G. tank 31 and the air mixer 33 for controlling the flow of L.P.G. to the air mixer 33. The solenoid valve 32 is controlled by the control unit 17. When the sensor 25 measures the temperature of the exhaust pipe 12 below a preset level, control unit 17 actuates the ignition of gas and air mixture at the nozzle 34 through an ignition means located in the nozzle 34 to heat the catalytic member 16. The heated catalytic member 16 begins its function. The flow rate of L.P.G. at the solenoid valve 32 is constantly monitored by the control unit 17 through temperature input signals coming from the sensor 25.

Figure 14:
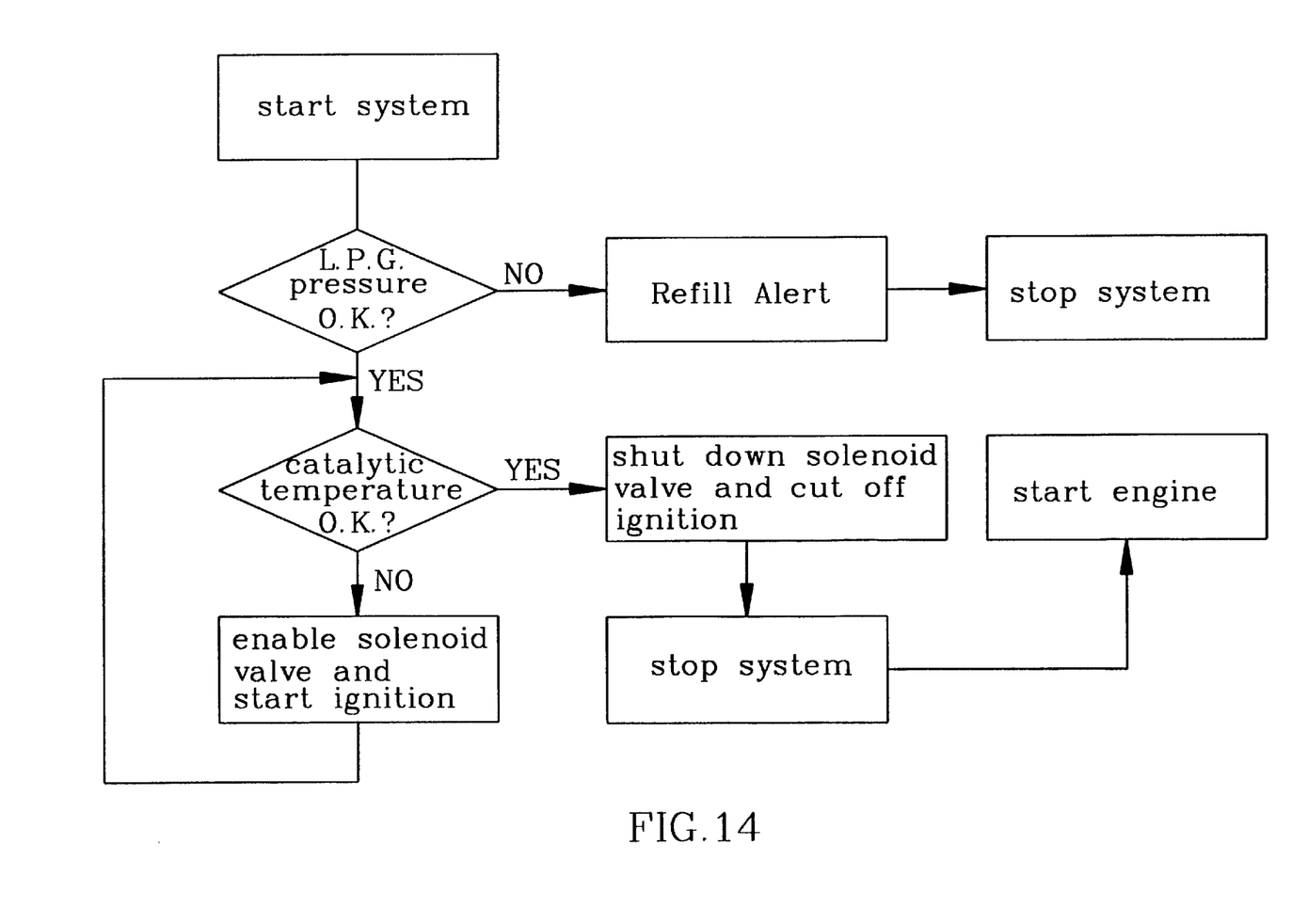
FIG. 14 is an operational flowchart of another embodiment shown in FIG. 13.

FIG. 14 illustrates the operation procedures of this embodiment of using L.P.G. as heating medium. This embodiment has the following advantages:

1. Heating the catalytic member by liquid petroleum gas is faster than electric heater. Cold start time of the motor cycle is thus shorter.

2. Battery needs only to ignite burning at the initial stage. Once gas being ignited, its burning is self-sustainable. Therefore it won't drain the battery power like an electric heater would do.

3. L.P.G. may be filled much faster than to recharging the battery.

4. Service life of the catalytic member can be longer because it can be warmed up rapidly to function, then be disconnected when exhaust gas temperature reaches desired operational level.

Since the catalytic member will be heated by liquid petroleum gas only at initial cold start period or when the motorcycle is running at very low speed, the propane gas consumption won't be very heavy. The whole structure of this invention may be made in compact size without causing too much intrusion to motorcycle rider.

We claim:

1. A catalytic converter with a heating means for use in a motorcycle, comprising:

a catalytic member installed in an exhaust pipe of a motorcycle for converting exhaust toxic gases to non-toxic gases;

a liquid petroleum gas heating means including an air mixer, a liquid petroleum gas tank which contains a liquid petroleum gas and is connected to said air mixer, a solenoid valve which is connected between said liquid petroleum gas tank and said air mixer for controlling a flow rate of said liquid petroleum gas into said air mixer, and a nozzle which is located at one end of said catalytic member and is connected to said air mixer;

a control unit connected to said solenoid valve and an ignition means located in the nozzle, for controlling said solenoid valve and for igniting a mixture of air and said liquid petroleum gas at said nozzle to heat said catalytic member when a sensor connected to said catalytic member, senses an initial cold starting temperature in said catalytic member below a light-off temperature; and a battery wired to said control unit.

* * * * *